United States Patent
Aharoni et al.

(10) Patent No.: US 10,091,925 B2
(45) Date of Patent: Oct. 9, 2018

(54) ACCURATELY DETERMINING CROP YIELD AT A FARM LEVEL

(71) Applicant: International Business Machines Corporation, Armonk, NY (US)

(72) Inventors: Ehud Aharoni, Kfar Saba (IL); Upendra D. Chitnis, New York, NY (US); Levente Klein, Tuckahoe, NY (US); Yehuda Naveh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 14/964,288

(22) Filed: Dec. 9, 2015

(65) Prior Publication Data
US 2017/0164556 A1 Jun. 15, 2017

(51) Int. Cl.
*A01B 79/00* (2006.01)

(52) U.S. Cl.
CPC .................. *A01B 79/005* (2013.01)

(58) Field of Classification Search
CPC ........... A01D 41/1271–41/1273; G06Q 50/02; A01B 79/005; A01B 79/02
See application file for complete search history.

(56) References Cited

U.S. PATENT DOCUMENTS

| | | | |
|---|---|---|---|
| 6,119,069 A | 9/2000 | McCauley | |
| 7,047,133 B1 | 5/2006 | Dyer et al. | |
| 7,058,197 B1 | 6/2006 | McGuire et al. | |
| 8,306,750 B2 | 11/2012 | Griffin | |
| 2009/0022359 A1 | 1/2009 | Kang et al. | |
| 2014/0107927 A1 | 4/2014 | Rojas | |
| 2014/0129146 A1* | 5/2014 | Romier | A01B 79/005 702/5 |

FOREIGN PATENT DOCUMENTS

WO    WO2014120887 A1    8/2014

OTHER PUBLICATIONS

P.J. Pinter Jr. et al., "Remote sensing for crop management," Photogrammetric Engineering & Remote Sensing vol. 69, No. 6, Jun. 2003, pp. 647-664.

T.P. Robinson et al., "Comparing the performance of techniques to improve the quality of yield maps," Agricultural Systems, vol. 85, No. 1, 2005, pp. 19-41 (published Sep. 2004).

(Continued)

*Primary Examiner* — Toan Le
(74) *Attorney, Agent, or Firm* — Vazken Alexanian; Michael J. Chang, LLC

(57) ABSTRACT

Techniques for using a scaling relationship between crop drymass and elevation at a farm level to redistribute crop yield data are provided. In one aspect, a method for analyzing crop yield is provided. The method includes the steps of: obtaining crop yield data for a farm; cleansing the crop yield data using a data filter(s), wherein one or more data points are eliminated from the crop yield data by the data filter; and redistributing a value of the data points eliminated from the crop yield data to data points remaining in the crop yield data to create a crop yield distribution for the farm.

19 Claims, 4 Drawing Sheets

(56) References Cited

OTHER PUBLICATIONS

D.B. Myers et al., "Issues in analysis of soil-landscape effects in a large regional yield map collection," International Conference on Precision Agriculture Abstracts & Proceedings, 2012 (16 pages).

Z. Jiang et al., "A review of data assimilation of crop growth simulation based on remote sensing information," Third International Conference on Agro-geoinformatics, Aug. 2014, 6 pages.

Smith et al., "Geospatial Analysis—A Comprehensive Guide to Principles, Techniques and Software Tools, A free web-based GIS resource," 5th edition, chapter 6.2.1 (2015) (published Dec. 2014) 6 pages.

L.M. Thompson, Climatic Change, Weather Variability, and Corn Production. Agron. J. 78:649-653 (Jul./Aug. 1986).

Volkovs et al., "Continuous data cleansing," 2014 IEEE 30th International Conference on Data Engineering (ICDE), Mar./Apr. 2014, pp. 244-255.

\* cited by examiner

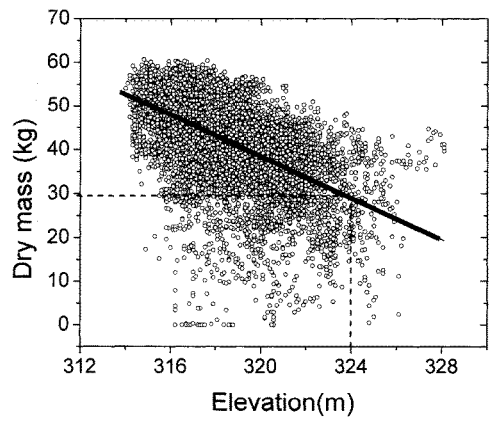
FIG. 2A
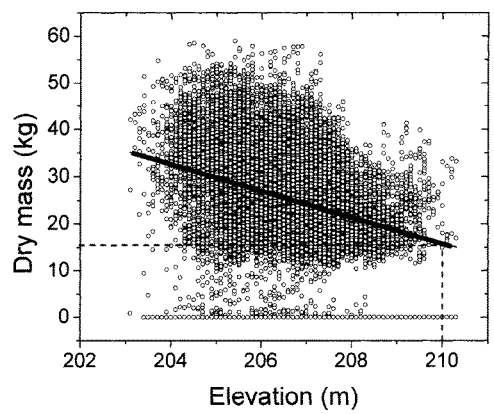
FIG. 2B
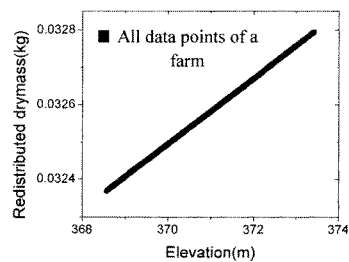
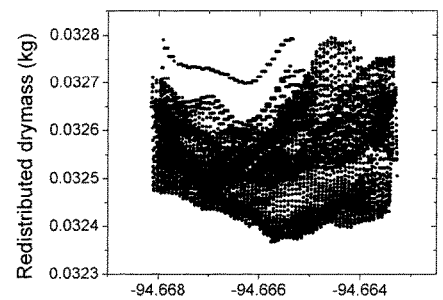
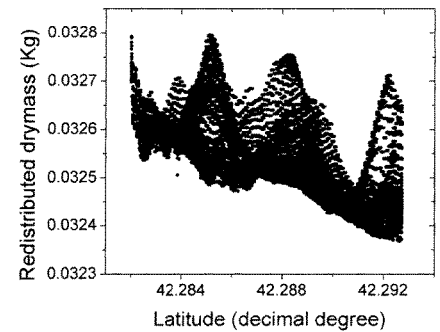
FIGS. 3A-D

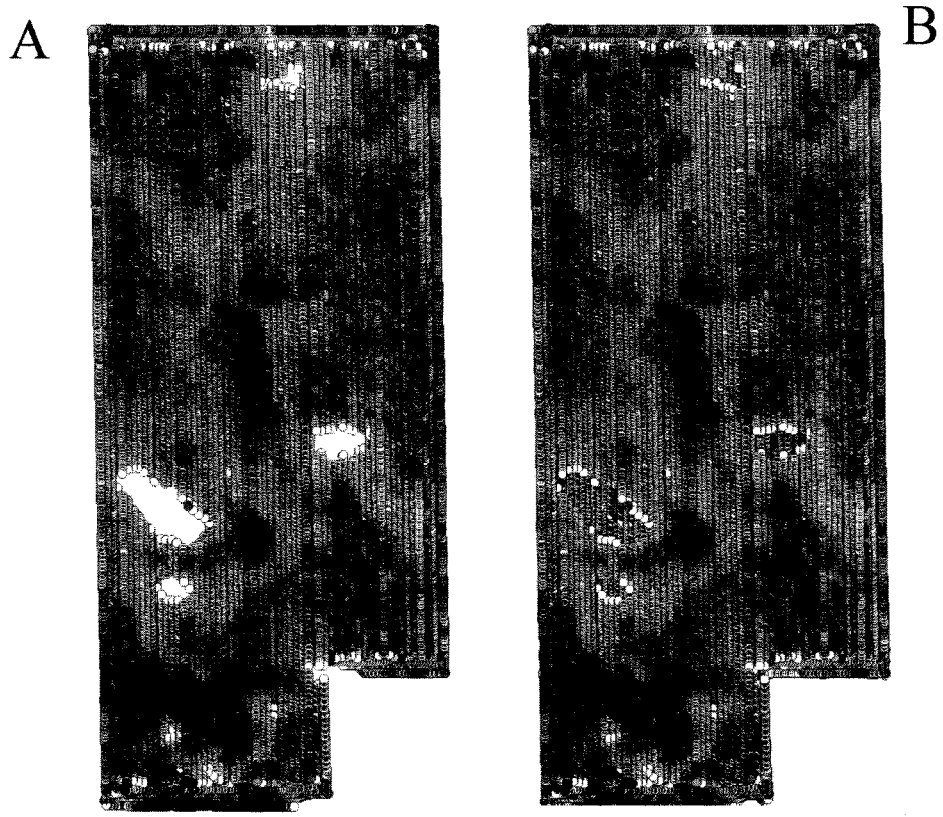
FIGS. 4A-B
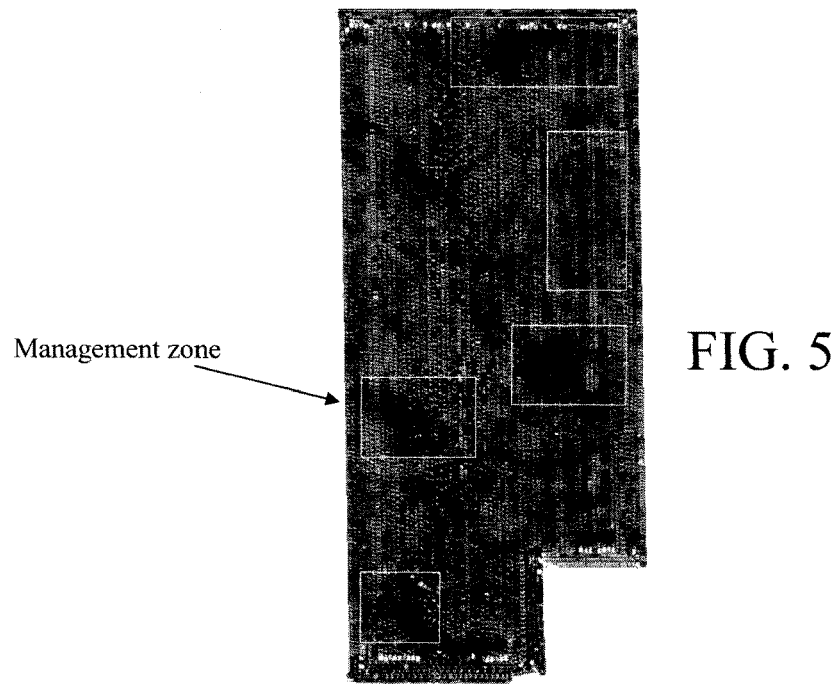
FIG. 5

ACCURATELY DETERMINING CROP YIELD AT A FARM LEVEL

FIELD OF THE INVENTION

The present invention relates to analyzing crop yield for a farm, and more particularly, to techniques to compensate for missing data based on using a scaling relationship between crop drymass and elevation at a farm level to estimate accurately crop yield data and thereby produce a more accurate representation of actual crop yield distribution across the farm.

BACKGROUND OF THE INVENTION

Knowing the crop yield for a growing season is important for running and managing a farm. To determine crop yield, data collected from the field is typically run through an analysis tool which contains filters that 'cleanse' the data by removing outlying data points and eliminate errors that are integrated due to sensor calibration and mechanical defects of the machinery. It can happen that only 10% of the yield data may be collected but the yield distribution at the whole farm level may be of interest. In such situations interpolation techniques are employed where distant data points are used to create intermediary values between existing points. Interpolation techniques may, however, be inaccurate.

Even when the whole data is available for the farm, standard yield processing methods like high-pass and low-pass filters tend to eliminate a large percentage of the data collected. For instance, it is common practice to eliminate more than 20%, and in some situations the eliminated data points can be up to 80% of the data points collected. Some of the eliminated data points may be valid but are still eliminated due to the filter settings, and their order may influence how data points are eliminated. There is however a need to create a continuous distribution of the crop yield data across the farm, as this data may drive additional prescriptive services such as variable rate seeding, fertilization, management, irrigation, etc.

In order to fill in data points for regions where the data was eliminated by the filters, a simple linear interpolation or Kriging is often carried out across the remaining data points. However, since interpolation simply takes the distance between existing points and weights them, the resulting yield distribution is oftentimes not a good representation of the true yield distribution across the farm.

Therefore, there is a need to create yield maps that are as close as possible to the true yield distribution at the farm level.

SUMMARY OF THE INVENTION

The present invention provides techniques for using a scaling relationship between crop drymass, and elevation at a farm level to redistribute crop yield data. In one aspect of the invention, a method for analyzing crop yield is provided. The method includes the steps of: obtaining crop yield data for a farm (e.g., from a harvesting machine); cleansing the crop yield data using at least one data filter, wherein one or more data points are eliminated from the crop yield data by the data filter; calculating a total value of the data points that are eliminated (e.g., by adding up the values of the data points that are eliminated), and redistributing the total value of the data points that are eliminated to data points remaining in the crop yield data to create a crop yield distribution for the farm. The redistribution in locations where there is no data available can be based on proximity data sources that are obtained from other sources like elevation. Elevation data may be obtained for the farm, and a scaling relationship may be determined between crop yield and elevation on the farm using the crop yield data and the elevation data. The scaling relationship may be used to recreate the crop yield data for regions of the farm for which the one or more data points have been eliminated by the data filter. The value of the data points eliminated from the crop yield data may be redistributed to the data points remaining in the crop yield data based on the scaling relationship.

A more complete understanding of the present invention, as well as further features and advantages of the present invention, will be obtained by reference to the following detailed description and drawings.

BRIEF DESCRIPTION OF THE DRAWINGS

FIG. 2A is a diagram illustrating crop yield data plotted as a function of elevation for a first exemplary farm according to an embodiment of the present invention;

FIG. 2B is a diagram illustrating crop yield data plotted as a function of elevation for a second exemplary farm according to an embodiment of the present invention;

FIG. 3A is a top-down elevation map of redistributed crop drymass on a farm according to an embodiment of the present invention;

FIG. 3B is a diagram illustrating a linear relationship between the redistributed crop drymass and elevation according to an embodiment of the present invention;

FIG. 3C is a longitude elevation map of redistributed crop drymass on the farm according to an embodiment of the present invention;

FIG. 3D is a latitude elevation map of redistributed crop drymass on the farm according to an embodiment of the present invention;

FIG. 4A is an elevation map illustrating original drymass distribution on a farm according to an embodiment of the present invention;

FIG. 4B is an elevation map illustrating drymass redistribution on the farm based on elevation based scaling according to an embodiment of the present invention;

FIG. 5 is an elevation map of a farm in which several different management zones have been identified according to an embodiment of the present invention.

DETAILED DESCRIPTION OF PREFERRED EMBODIMENTS

Figure 1:
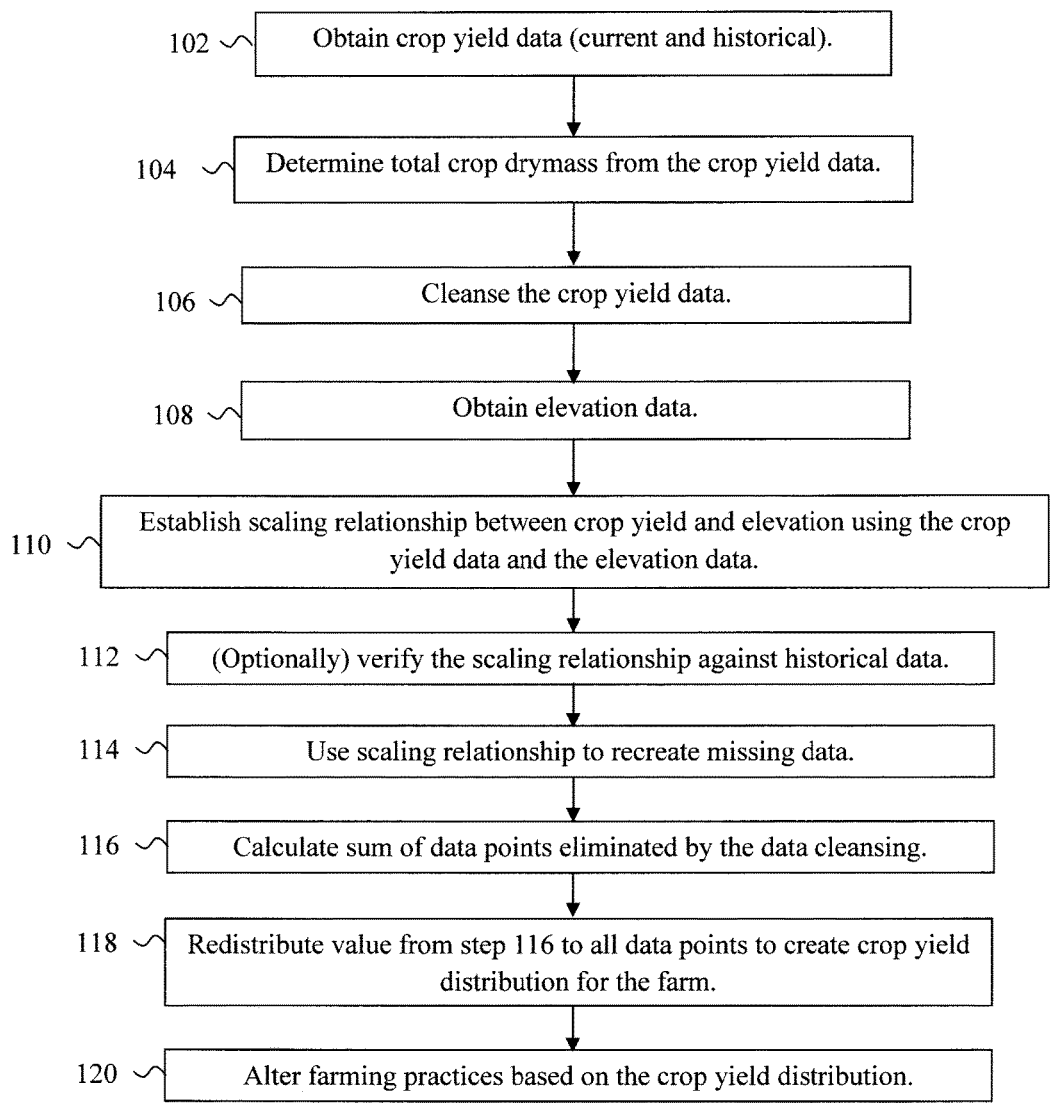
FIG. 1 is a diagram illustrating an exemplary methodology for analyzing crop yield at a farm level according to an embodiment of the present invention.

As provided above, in conventional crop yield analysis linear interpolation or Kriging is commonly used to supply data for areas where data is missing or has been filtered out during the data cleansing process. However, the result is not always a good representation of the true crop yield.

Advantageously, it has been found that elevation and the weather (e.g., precipitation) determine more than 40% of the local crop yield variation. Elevation products like slope and aspect ratio are also variables that affect yield distribution. The elevation slope determines the steepness and direction of the terrain change at any point, while the aspect ratio describes the direction that the slope faces. The calculations of slope and aspect ratio are described, for example, in de Smith et al., "Geospatial Analysis—A Comprehensive Guide to Principles, Techniques and Software Tools, A free web-based GIS resource," 5$^{th}$ edition, chapter 6.2.1 (2015) (published December 2014), the contents of which are incorporated by reference as if fully set forth herein. Both slope and aspect ratio are important parameters to determine the direction in which precipitation or water will flow and the moisture retention properties of the soil. For example, if the slope is downward and facing South, where exposure to the sun will be maximum, this will most likely result in lower moisture than a farm area that has zero slope and faces North and the sun will not reach it to dry out the soil. Slope and aspect ratio can be calculated from elevation data or topography. Depending on the local characteristics of the slope and aspect ratio, the crop yield will be directly impacted by soil moisture and exposure to sun; adequate soil moisture and exposure to sun will result in that location having a maximum possible yield. See, for example, L. M. Thompson, "Climatic Change, Weather Variability, and Corn Production. Agron. J. 78:649-653 (1986), the contents of which are incorporated by reference as if fully set forth herein. Accordingly, a more realistic approach is to leverage the topography at the local scale (i.e., at the farm level), along with weather effects to supply missing/eliminated data and to create a crop yield distribution that more closely approximates the true yield on the farm.

Provided herein are techniques to recreate crop yield data at the farm level based on raw crop yield data that is cleansed and then combined with topography and weather data. The present techniques operate on the notion that much of the crop yield data eliminated by the data cleansing process is not 'bad' data and can in fact be redistributed across all data points (while conserving the total crop drymass at the farm level). Namely, many standard data cleansing tools used are meant for a broad spectrum of applications and as a result have filters that are set conservatively or without a clear understanding of the impact different settings may have on the final outcome. As a result, a large portion of the data collected is eliminated—including 'good' data that is not due to any equipment malfunction and/or faulty reading. Further, for any data points that are in fact 'bad' data (i.e., data resulting from a malfunctioning equipment and/or based on a faulty reading) the redistribution of any such 'bad' data is diluted over the entire data set. Crop drymass is the crop one is left with after eliminating the other part of the plants that are not valuable.

Further, the present process preferably is performed in conjunction with a scaling relationship that is established between crop yield and elevation at the farm level. The notion here is that crop yield varies with topography/ elevation. For instance, for a particular growing season the crop yield might decrease with increasing elevation. This might be the case during a dry season when the precipitation is lower than average for that location and the high elevation points will be drier (being that they are exposed to more sun) while lower lying regions may have more moisture retained in the soil. These scaling relationships may change during a wet season when lower lying areas may have water pooling that will reduce the crop yield. This scaling relationship between crop yield and elevation may be leveraged during the present redistribution process. For instance, in the simplest case, the data points which have been eliminated by the data cleansing process (see above) can be redistributed evenly across all of the data points. However, to garner a more accurate representation of the actual crop yield, it is preferable to weigh the data redistribution based on the scaling relationship established between the crop yield and elevation. Also, the crop yield/elevation relationship can be used to populate areas of the farm where data points are missing (such as where data has been eliminated by the cleansing process). Namely, as will be described in detail below, based on an area's elevation, the yield vs. elevation scaling can be used to supply a yield value for the area.

Further, other factors can affect the scaling relationship between crop yield and elevation. For instance, the amount of precipitation during a growing season can change the scaling relation of yield vs. elevation. To give a simple example, during a growing season with a large amount of rainfall, water might collect or pool in low lying areas. Standing water is bad for growing conditions and, in that case, the crop yield might increase with an increase in elevation for that growing season. Contrast that with a growing season with a lesser amount of rainfall. In that case, the lower elevations will have more ground water than at higher elevations and, as a result, the crop yield might decrease with an increase in elevation for that growing season. Thus, conditions such as the weather (i.e., precipitation) can affect how the crop yield scales with the elevation. See below.

As will be described in detail below, some additional features presented herein include soil data, historical trends in yield estimates, and/or historical data from neighboring farms, to verify the yield versus elevation scaling relationship. Other features include extending the present process to farms which use variable rate management (i.e., where the farm is not being managed uniformly—such as when there is prescriptive seeding, fertilizers are being used, etc.). In that case the farm can be segmented into management zones where local variation are accounted and used to recreate the yield map. As is known in the art, prescriptive seeding involves (intentionally) varying seeding rates across different sections of the farm. Likewise, the application of fertilizers to different sections of a farm will vary crop yield. Thus, in those cases it may be preferable to look at smaller segments of the farm (also referred to herein as "management zones") to better account for local variations.

An overview of the present techniques is now provided by way of reference to methodology 100 of FIG. 1 for analyzing crop yield at a farm level. In step 102, crop yield data for the farm is obtained. It is assumed that the crop yield data has been collected using a method known in the art.

A number of different techniques are known in the art for collecting crop yield data. For instance, a yield monitor is a device commonly employed on modern combine harvesters that calculates and records the crop yield as the harvester moves through the fields and collects the crop. The yield monitor has sensors configured to measure the mass flow and speed of the crop being harvested in order to calculate the crop yield. Most yield monitors and/or harvesters are equipped with a global positioning system in order to geographically locate the yield data being collected. The data collected and stored by the yield monitors can be obtained by the present system for analysis in step 102.

The data obtained in step 102 preferably includes the crop yield data for a given growing season. Typically, crops that are grown over a particular growing season are harvested at the end of that growing season. It is at the time of harvesting that the crop yield data can be collected (see above). Thus, users who manage the farm can (by way of the present techniques) get an accurate assessment of the crop yield across their farm for that growing season. Also, as highlighted above, historical data of crop yield and weather may be used in accordance with the present techniques to verify the scaling relationship that will be determined (for the present growing season) between crop yield and elevation. Furthermore, the moisture distribution at the farm level can be used to obtain locations that have the right combination of elevation and amount of precipitation to establish similar responses in two different years. In general, it is expected that similarities can exist between different locations at different times for the same farm. Thus, in step 102 historical crop yield data may also be obtained. By way of example only, the historical data obtained in step 102 may be for the previous two years.

The historical data obtained can be from the same farm, if available. However, if historical crop yield data is not available for the farm in question, then historical data can be inferred by analyzing data from a neighboring farm that has historical data available. As will be described in detail below, the vegetative index (VI) can be used to compare the two farms. While absolute values of the VI may be different between farms due, for example, to different management practices, it is expected that the relative changes are a good representations of the spatial variability of the yield at the farm level. However, it is desirable to use a farm that is in close proximity in order to have similar soil properties, weather conditions, etc.

In case the yield is not available from farms that are situated in the neighborhood, then the area of comparison can be extended. In such situations the patterns of precipitation, average temperature, solar radiation, soil properties, elevation, and farm management practices are compared across larger geographies. If two farms can be found that share similar soil, weather patterns, sun exposure, elevation and farming practices, and one has yield data then it can be assumed that other farm will have similar yield values in locations that share the same characteristics. For the present analysis, the original farm that has yield data is considered and the distribution of the yield data is considered and each yield value will be associated for a certain area where the crop was harvested. The second farm that has no data will be segmented into areas similar in value to the farm with yield data, and exact correlation will be established between areas that share the same characteristics. If one such area is found, then it is assumed that both farms in that location will have the same yield. On the farm having no yield data, once a location has an associated yield value, the yield in all of the other locations can be reconstructed using the elevation and yield scaling relationship derived for the farm that has yield data. On the farm having no yield data, the local yield variations for locations that do not share the exact same characteristics determined by slope and aspect ratio from topography and soil will determine the variations of the yield at the local level. It is notable that if all weather, soil, farming practices, seed properties, and topography data are similar between two farms, and if the yield for one data point can be calculated on the farm without data, then all other data points can be reconstructed.

Further steps can be taken to validate the crop yield data. For instance, one can validate the the total mass against an independent measure like trade in receipt weight measure (i.e., receipt values from the trade in stations where farmers sell their crops can be used). This data is aggregated and is reported to USDA that they publish at the end of the season.

In step 104, the current crop yield data (i.e., the crop yield data collected in step 102 for the current growing season) is used to calculate the total crop drymass for the growing season. As will be described in detail below, the present data redistribution process is performed under the assumption that the total crop drymass is conserved at the farm level. Namely, it is assumed that the total crop drymass is a fixed value, and all redistribution of data points will be carried out while maintaining the total crop drymass constant across the farm. To look at it another way, the value of the total amount of crop drymass for the farm is a fixed constant in the present process. Thus, a preliminary assessment of the total crop drymass for the farm is needed. This value is calculated in step 104. The total amount of crop drymass can be calculated in step 104 as simply being the sum of the all of current crop yield data points obtained in step 102.

In step 106, the data is cleansed. As provided above, data cleansing is typically performed using a data cleansing tool through which the data is run. The tool includes filters which eliminate outlying data points from the data set. A variety of data cleansing tools known in the art may be used in step 106 to cleanse the crop yield data. By way of example only, the Yield Editor program, available from the U.S. Department of Agriculture, is a tool that provides a variety of automated filters for processing and cleaning yield data. Details of data cleansing are provided, for example, in Volkovs et al., "Continuous data cleansing," 2014 IEEE $30^{th}$ International Conference on Data Engineering (ICDE), March/April 2014, pgs. 244-255, the contents of which are incorporated by reference as if fully set forth herein.

As provided above, commercially available data cleansing tools are broadly applicable to a variety of different settings and, as a result, the constraints set for the filters in these tools are not tailored for any one specific application. Oftentimes the filters are set too high. As a result, a large amount of a data set fed through the cleansing tools is filtered out. A portion of the data eliminated by the filters is, however, good data. Namely, just because the filters eliminate a data point (as an outlier) it does not mean that the data point is the result of malfunctioning equipment or a faulty reading. Thus, by way of the present techniques, these eliminated data points are redistributed across all of the data points. The effect of any actual bad data (i.e., data resulting from malfunctioning equipment and/or a faulty reading) will be minimal since the redistribution will occur over the entire data set and will preferably be scaled based on the yield versus elevation relationship.

In accordance with the present techniques it is assumed that in step 106 the crop yield data is run through a commercially available yield data cleansing tool, and by way of this data cleansing process multiple data points are eliminated from the data set. Examples of suitable commercially available yield data cleansing tools were provided above which may be used in accordance with the present techniques.

Thus, as a result of the data cleansing process (step 106), data relating to the crop yield of one or more regions of the farm will be missing from the data set due to the corresponding data points having been removed by the filters. Namely, crop yield data was obtained for these regions in step 102, but eliminated (e.g., as being outlying data) from the data set by the filters. In order to improve on conventional processes which apply a simple interpolation process to fill in these missing data points, the present techniques leverage a scaling relationship between crop yield and elevation. This crop yield vs. scaling relationship is also preferably used herein to redistribute the eliminated data points across the entire data set (see below).

Thus elevation data for the farm is needed. This elevation data for the farm is obtained in step 108. Elevation data can be obtained from conventional topology mappings of the location. By way of example only, tools provided by U.S. Geological Survey (USGS) mapping service, allow users to obtain the elevation profile of a location. Thus, in step 108, the topology of the farm can be fed into the present system from open source data provided by the USGS. Also, in the case where historical data is not available and a neighboring farm is needed for historical comparison, one might also obtain the topology data for the neighboring farm in step 108.

Next, in step 110 the crop yield data and the elevation data (obtained in steps 102 and 108, respectively) are used to establish a scaling relationship between crop yield and elevation for the farm. As will be described in detail below, this crop yield versus elevation scaling relationship may be established simply by plotting the crop yield data as a function of the elevation data for the farm after the outlier data points were eliminated. As highlighted above, conditions such as the amount of precipitation during the growing season can affect this scaling relationship. For instance, as provided above, in drier growing seasons more ground water might be present at lower elevations and, as a result, the crop yield might decrease with an increase in elevation. However, with increased rainfall the pooling of water in low lying areas (which can negatively impact crop yield) might instead make growth conditions more favorable at higher elevations. Accordingly the crop yield vs. elevation relationship might shift to where crop yield increases with an increase in elevation.

As is known in the field of statistics, the correlation between two variables can be represented by a value known as the correlation coefficient. The correlation coefficient shows the extent to which changes in the value of one variable (in this case crop yield) are correlated to changes in the value of the other variable (in this case elevation). As provided above, factors such as the amount of rainfall during a growing season can change the correlation coefficient since these factors can affect the scaling relationship between crop yield and elevation. This concept is illustrated in FIGS. 2A and 2B.

Specifically, referring briefly to FIGS. 2A and 2B, exemplary representations of the crop yield and elevation data are shown for two different farms, i.e., a first farm in FIG. 2A and a second farm in FIG. 2B, wherein the crop yield data is plotted as a function of elevation. In each of FIG. 2A and FIG. 2B, the crop yield vs. elevation scaling is indicated by a solid line which corresponds to the slope of the crop yield vs. elevation distribution. It is notable, that while in both cases the crop yield generally decreases with increased elevation, the scaling relationship (as indicated by the slope of the solid line) is different for the two farms. One potential source of the variation may be the effect of precipitation during the growing season. Specifically, the slope may change when the weather would be drier or there would be more precipitation.

Referring back now to FIG. 1, as provided above, it is preferable to verify the scaling relationship established in step 110 against historical data for the farm, if available, or from a neighboring farm with comparable soil properties, precipitation (i.e., the historical data obtained in step 102—see above). See step 112. Namely, crop yield trends require data collection over multiple growing seasons. Thus, historical data (i.e., data from one or more previous growing seasons) is often available for each farm. Thus, in the most straightforward case, the historical data from the farm in question is compared to the data for the current growing season. However, if historical data is not available for the farm in question, then data from a neighboring farm that has historical data can be leveraged for comparison. To use as close of a representation as possible, the neighboring farm should have similar crop drymass, soil properties, rainfall, etc. To compare drymass between two farms, one might use the vegetation index (VI) as a comparison tool. As is known in the art, the VI is a tool to study and identify vegetation based on a ratio of reflected wavelength bands from the Earth's surface that are measured by satellite-based sensors. The basic principle behind the VI is that plants (which carry out photosynthesis) absorb visible light but reflect light in the near infrared wavelength band. See, for example, U.S. Patent Application Publication Number 2009/0022359 by Kang et al., entitled "Vegetation Index Image Generation Methods and Systems," the contents of which are incorporated by reference as if fully set forth herein. Thus, the VI quantifies the wavelengths of light being reflected by plant matter. Vegetation index data can be calculated from images taken, for example, from Landsat Earth satellite imagery tool available from the U.S. Geological Survey or the Moderate Resolution Imaging Spectroradiometer (MODIS) available from the National Aeronautics and Space Administration (NASA). In different stages of the harvest growth, different indices extracted from the spectral data can be used. For example, early in the season a normalized difference vegetation index (NDVI) can be used, but in midseason the NDVI is saturated and plateaus in value. Other indices, like Green Vegetation index, will perform better in the second part of the season. These indices can be calculated from the spectral bands provided by Landsat and MODIS.

To compare soil properties, one may look at soil properties databases such as the Soil Survey Geographic (SSURGO) database available from the U.S. Department of Agriculture. These maps allow one to identify the dominant soil conditions in locations like sandy or clay. They also provide information about the water holding capacity and hydraulic conductivity of the soil at the farm level. The SSURGO data is organized as polygons which represent certain soil properties, and the data may contain information about the particular soil types found below ground. By way of example only, the farm used for comparison purposes might be selected from within the same polygon in the SSURGO data, so as to ensure a close match in soil properties.

A crop yield/elevation scaling relationship established using the historical crop yield data (whether it be from the same farm or from a neighboring farm) is then compared with that for the current growth season (established in step 110), and it is verified that under the weather conditions it follows either a positive or negative slope. If the scaling is correct (i.e., as determined by deviation of the weather from historical trends) then the scaling is used to fill in the missing data points from the yield map.

In order to create a crop yield distribution across the farm, values will be needed for the regions of the farm having missing data from the data cleansing process. According to an exemplary embodiment, those missing values are recreated using the crop yield versus elevation scaling relationship established in step 110. For instance, given the elevation of a region for which crop yield data is missing, one can simply look to the scaling relationship (see for example the scaling relationships shown in FIG. 2A and FIG. 2B) and find a corresponding crop yield value to ascribe to the region. To use a simple example to illustrate this principle, for the scaling relationship shown in FIG. 2A—if a crop yield value is missing for a region of that farm having an elevation of 324 meters (m), then a crop yield value of 30 Kilograms (Kg) can be assigned to that region. Similarly, for the scaling relationship shown in FIG. 2B—if a crop yield value is missing for a region of that farm having an elevation of 210 m, then a crop yield value of 15 Kg can be assigned to that region.

In step 116, a sum of the value of the crop yield data eliminated by the data cleansing process (performed in step 106) is determined. To use an example, if in step 106 the filters eliminated 6 data points having the crop yield values of 3 Kg, 4 Kg, 60 Kg, 65 Kg, 70 Kg, and 71 Kg, then in step 116 a sum of the eliminated data points would be 3+4+60+65+70+71=273 Kg. Of course there would likely be many more eliminated data points to consider, and this simple example is merely provided to illustrate the concept. The present techniques leverage the notion that much of the data eliminated by the filters is not erroneous, but rather a consequence of an overly conservative filter constraint. Thus, rather than simply disposing of this data, it will be redistributed to the remaining data points in the crop yield data set.

Namely, in step 118 the total value (calculated in step 116) of the eliminated data points is redistributed to all of the data points in the data set. This can be carried out in a number of different ways. In the simplest case, an equal amount of this value is distributed among all of the data points in the crop yield data set. Again using a simplified example to illustrate this point, if a total of 10 data points were collected in step 102 from which the above six data points were eliminated, then the value 273 Kg is distributed equally among the ten data points in the data set, i.e., a value of 27.3 Kg is added to each data point. In this manner, the total crop drymass on the farm (see step 104) is conserved.

As described in detail above, the crop yield is correlated with elevation. Thus, for a more accurate redistribution of the data, the total value of crop harvested from the farm (including the eliminated data points) can be summed up and, when the redistribution is done across the farm, the total weight is maintained constant including the mass of the data points that are added to the map. The total weight is constant across the farm before the cleansing and after the cleansing process. Again, the total crop drymass on the farm (see step 104) is conserved.

The present data redistribution process is further illustrated in FIGS. 3 and 4. Referring briefly to FIGS. 3A-D, an example is shown of crop yield data redistribution weighted by the scaling relationship between the yield and elevation. In this example, a linear scaling relationship between crop yield and elevation is present wherein the lower elevation data will get more drymass allocated while the higher elevation data points will get less drymass. The addition is determined by the scaling relation established in FIG. 2. Specifically, FIGS. 3A, 3C, and 3D are top-down, longitude, and latitude elevation maps, respectively, of the redistributed crop drymass on the farm. FIG. 3B shows the linear relationship between the redistributed crop drymass and elevation in this example. FIG. 4A is a yield map where data is filtered out due to very small crop yield numbers. The two holes are filled up in FIG. 4B where the values of the yield are obtained from the scaling relation shown in FIG. 2.

So far it has been assumed that the farm is being uniformly managed, i.e., that the same growing practices are being implemented uniformly across the farm. However, some farms might employ practices such as prescriptive seeding or different fertilizers in different regions of the farm which will affect the crop yield in those regions. As provided above, prescriptive seeding involves (intentionally) varying seeding rates across different sections of the farm. This is done to maximize crop yield. Likewise, varying the type and/or amount of fertilizers used in different regions of the farm will affect crop yield. Thus, in that case, to look at the data at the farm level might not provide the most accurate representation of the crop yield. One might instead look at different regions of the farm separately. These regions, also referred to herein as "management zones," may be delineated based, for example, on high or low crop drymass areas of the farm. Take for example the case of fertilizers. Fertilizers may not be applied to the farm uniformly (for example—fertilizer use may be more prevalent in areas where growing conditions, i.e., sunlight, precipitation, etc. are not optimal). Where the fertilizers are used, the crop drymass is expected to be relatively high. A metric, such as the vegetative index (VI), may be used to find these areas of high crop mass on the farm. Higher vegetation index results in higher yield value and the vegetation maps can be clustered using values of the VI that fall within a certain range. These categories can be grouped in management zones where the nitrogen or other inputs can be adjusted for that zone to bring yield value up to the maximum value. As a rule of thumb, 1 pound of nitrogen results in a 1 bushel increase of corn. To maximize the yield in that area, the difference between maximum yield and actual yield is translated into an amount of fertilizer needed, and that amount of fertilizer is delivered. For instance, a threshold VI can be set, and any area(s) of the farm having a VI above the threshold are considered to be part of a separate management zone, which may or may not (see FIG. 5) be continuous across the farm. The steps of methodology 100 may then be performed independently for each of the management zones wherein the scaling relationship is established (for each of the zones) and the redistribution is applied (to each of the zones), etc. FIG. 5 is an exemplary elevation map of a farm in which several different management zones have been identified. The notion here is to establish common segments (management zones) in the farm that fall under the same yield category.

Based on the above-described process, a crop yield distribution for the farm is produced. Farming practices can then be altered based on this crop yield distribution. See step 120. For instance, in regions of the farm with relatively low crop yield, one might choose to allocate a greater amount of fertilizer to those regions, and/or implement prescriptive seeding practices in order to boost growth in those areas.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
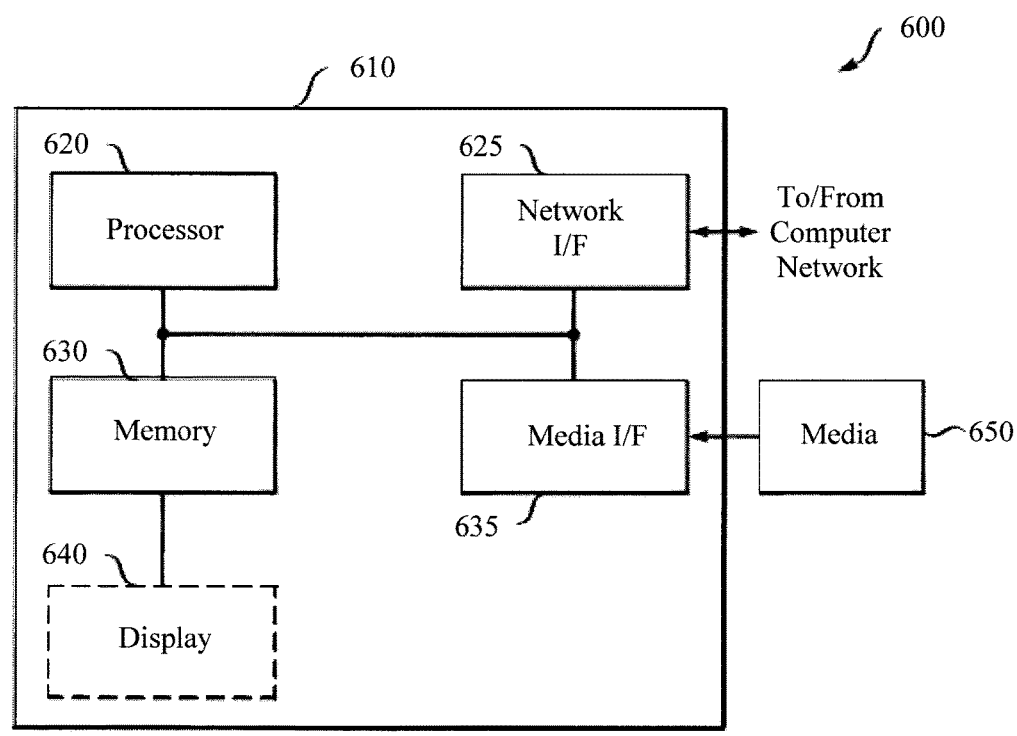
FIG. 6 is a diagram illustrating an exemplary apparatus for performing one or more of the methodologies presented herein according to an embodiment of the present invention.

Turning now to FIG. 6, a block diagram is shown of an apparatus 600 for implementing one or more of the methodologies presented herein. By way of example only, apparatus 600 can be configured to implement one or more of the steps of methodology 100 of FIG. 1.

Apparatus 600 includes a computer system 610 and removable media 650. Computer system 610 includes a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for analyzing crop yield performed by a processor device, coupled to a memory, the method comprising the steps of:
   obtaining crop yield data for a farm;
   cleansing the crop yield data using at least one data filter, wherein data points are eliminated from the crop yield data by the data filter;
   calculating a total value of the data points that are eliminated from the crop yield data by the data filter;
   redistributing the total value of the data points that are eliminated from the crop yield data by the data filter to data points remaining in the crop yield data to create a crop yield distribution for the farm; and
   altering farming practices based on the crop yield distribution by at least one of: i) varying seeding rates across different sections of the farm, and ii) varying a type and an amount of fertilizers used in different regions of the farm.

2. The method of claim 1, further comprising the step of:
   determining a sum of the value of the data points eliminated from the crop yield data.

3. The method of claim 2, wherein equal amounts of the sum of the value of the data points eliminated from the crop yield data are redistributed to the data points remaining in the crop yield data.

4. The method of claim 1, further comprising the step of:
   obtaining elevation products for the farm, wherein the elevation products comprise at least one of slope and aspect ratio.

5. The method of claim 4, further comprising the step of:
   determining a scaling relationship between the crop yield data and the elevation products.

6. The method of claim 5, further comprising the step of:
   obtaining historical crop yield data from one or more previous growing seasons.

7. The method of claim 6, further comprising the step of:
   verifying the scaling relationship using the historical crop yield data from one or more previous growing seasons.

8. The method of claim 5, wherein the value of the data points eliminated from the crop yield data is redistributed to the data points remaining in the crop yield data based on the scaling relationship.

9. The method of claim 5, further comprising the step of:
   using the scaling relationship to recreate the crop yield data for regions of the farm for which the one or more data points have been eliminated by the data filter.

10. The method of claim 1, further comprising the step of:
    determining a total crop drymass for the farm using the crop yield data.

11. The method of claim 1, further comprising the steps of:
    dividing the farm into multiple management zones; and
    performing the steps of claim 1 independently for each of the management zones.

12. A computer program product for analyzing crop yield, the computer program product comprising a non-transitory computer readable storage medium having program instructions embodied therewith, the program instructions executable by a computer to cause the computer to:
    obtain crop yield data for a farm;
    cleanse the crop yield data using at least one data filter, wherein data points are eliminated from the crop yield data by the data filter;
    calculate a total value of the data points that are eliminated from the crop yield data by the data filter;
    redistribute the total value of the data points that are eliminated from the crop yield data by the data filter to data points remaining in the crop yield data to create a crop yield distribution for the farm; and
    alter farming practices based on the crop yield distribution by at least one of: i) varying seeding rates across different sections of the farm, and ii) varying a type and an amount of fertilizers used in different regions of the farm.

13. The computer program product of claim 12, wherein the program instructions further cause the computer to:
    determine a sum of the value of the data points eliminated from the crop yield data.

14. The computer program product of claim 13, wherein equal amounts of the sum of the value of the data points eliminated from the crop yield data are redistributed to the data points remaining in the crop yield data.

15. The computer program product of claim 12, wherein the program instructions further cause the computer to:
    obtain elevation products for the farm, wherein the elevation products comprise at least one of slope and aspect ratio.

16. The computer program product of claim 15, wherein the program instructions further cause the computer to:
    determine a scaling relationship between the crop yield data and the elevation products.

17. The computer program product of claim 16, wherein the value of the data points eliminated from the crop yield data is redistributed to the data points remaining in the crop yield data based on the scaling relationship.

18. The computer program product of claim 16, wherein the program instructions further cause the computer to:
    use the scaling relationship to recreate the crop yield data for regions of the farm for which the one or more data points have been eliminated by the data filter.

19. The computer program product of claim 16, wherein the program instructions further cause the computer to:
    verify the scaling relationship using historical crop yield data from one or more previous growing seasons.

* * * * *